K. BROWN.
METHOD OF COMPOSITE MOLDING.
APPLICATION FILED SEPT. 21, 1918.
1,308,330.
Patented July 1, 1919.
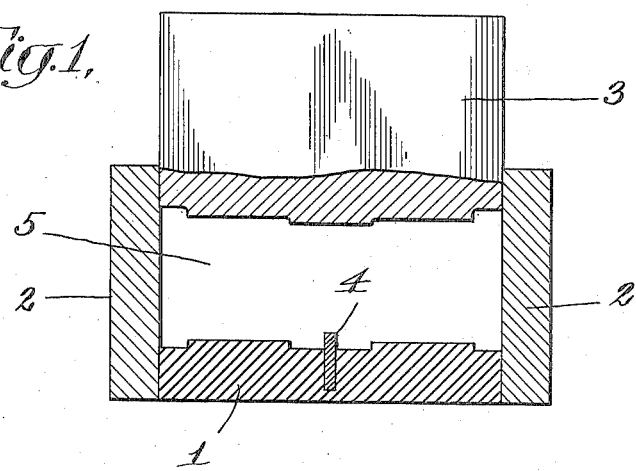
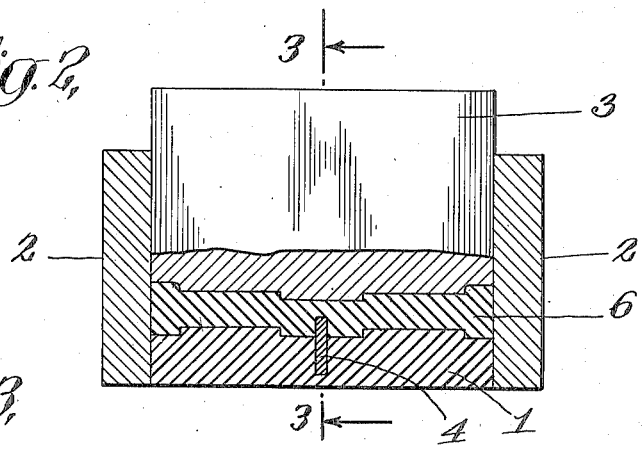
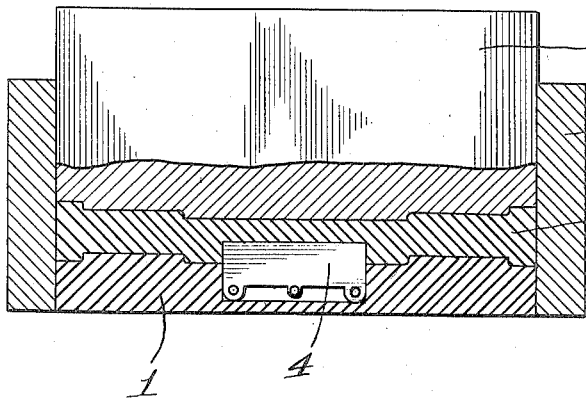
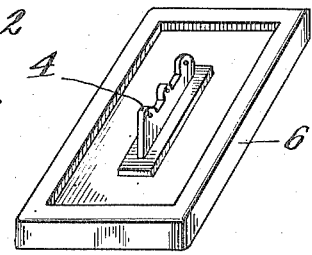
Inventor
Kirk Brown
By his Attorney
P. Edmonds

UNITED STATES PATENT OFFICE.

KIRK BROWN, OF MONTCLAIR, NEW JERSEY, ASSIGNOR TO CONDENSITE COMPANY OF AMERICA, OF BLOOMFIELD, NEW JERSEY, A CORPORATION OF NEW JERSEY.

METHOD OF COMPOSITE MOLDING.

1,308,330.  Specification of Letters Patent.  Patented July 1, 1919.

Application filed September 21, 1918. Serial No. 255,199.

*To all whom it may concern:*

Be it known that I, KIRK BROWN, a citizen of the United States, residing at Montclair, in the county of Essex and State of New Jersey, have invented certain new and useful Improvements in Methods of Composite Molding, of which the following is a specification.

My invention relates to a method of molding articles out of phenolic condensation products, which in their final condition are infusible. Such articles are commonly molded by placing a partly cured phenolic condensation product, or materials which are transformed by heat into a final infusible phenolic condensation product into a suitably shaped mold and applying pressure through a suitable pressing mechanism while subjecting the mold to a suitable amount of heat to cause the final reaction to take place in the mold, or to sufficiently harden and consolidate the article so that it may be removed from the mold and subsequently hardened to the completely hardened infusible condition.

The material which is placed in the mold is usually in the form of a powder or of plastic sheet material, which hardens, as stated, under the application of sufficient heat, becoming soft or fluid on the first application of the heat and subsequently hardening as the heating is continued. Difficulty is often experienced in molding from such material articles having relatively thin projections, which are formed by charging the material into suitable recesses in the mold. Such shaped articles are difficult to mold successfully because of the shrinkage stresses which occur in the relatively thin integral projections when the mass is hardened and cooled, such stresses being likely to crack the projecting portions. Also, in charging the mold, air is likely to be entrapped in the relatively narrow recesses in which such projections are formed, with the result that the molded article may be spoiled.

I have found that such difficulties may be overcome by a method of what I may term composite molding, which consists of forming projecting parts of articles of the character referred to from fibrous material coated or impregnated with phenolic condensation products or materials adapted to react on the application of sufficient heat to form infusible phenolic condensation products. Such inserted pieces may be formed of sheetlike material, which is preferably compressed and consolidated with the phenolic condensation product material carried thereby and preferably in what I may term a partly cured condition, that is to say a condition in which further reaction will take place on the application of sufficient heat. Such inserts may be placed in suitably formed recesses in a mold member so as to extend into the main mold cavity, which is thereupon filled with the plastic material so that the extended portion of the insert will be surrounded by this plastic material. Upon the application of heat and pressure the article will be shaped and hardened to infusibility with the inserted piece firmly bound to the main body of the article so as to form in effect an integral portion thereof. By this means the difficulties referred to above are overcome and at the same time the projecting portion of the article is formed of a material having greater toughness in most cases than the main body of the article, which is, of course, a decided advantage where the projecting portion or portions are relatively thin. The method referred to may likewise be used with advantage where the inserted piece does not extend beyond a surface of the article but where it forms an edge or other portion of the surface which it may be desirable to form of a less brittle material than the main body of the article. In all such cases I have found that inserted pieces of the character referred to will be bound to the main body of the article by a sort of welding process so as to form a practically integral structure therewith.

In order that my invention may be more clearly understood, attention is hereby directed to the accompanying drawings forming part of this application and illustrating one manner in which my method may be carried out. In the drawings, Figure 1 represents a cross section through a mold with the plunger of the press in raised position. Fig. 2 is a similar view showing the plunger in lowered position. Fig. 3 is a cross section taken on line 3—3 of Fig. 2, and Fig. 4 is a perspective view of a characteristic article molded in accordance with the process.

Referring to the drawings, I have illustrated a mold having a bottom plate 1 and a chase 2 together with a plunger or pressing member 3, which is adapted to move downwardly within the chase to compress the plastic material between it and the bottom plate. The drawings, of course, are to some extent diagrammatic. In operation, the mold is heated by appropriate means such as a steam jacket which surrounds the same in the press, it not being deemed necessary to illustrate the heating device.

The bottom plate 1 may be given a suitable surface configuration in accordance with the desired surface of the article to be formed. The piece 4 of fibrous material coated or impregnated with phenolic condensation product material is fitted into a suitable recess in the bottom plate 1 so that a portion of the same will extend upwardly into the main mold cavity 5 above plate 1. Suitable plastic material 6, as described, is then filled into the mold cavity in suitable quantity for the formation of the desired article, the mold heated as described and the press plunger 3 lowered, whereupon the article will be shaped and hardened as described. A characteristic article of the sort to the formation of which my method is particularly adapted, is illustrated in Fig. 4. It will, of course, be obvious that one or a plurality of projections such as that illustrated at 4 may be provided on each article in any desired relation to the surface of the article.

The pieces of inserted material, such as that shown at 4, are preferably formed of fiber or paper impregnated or coated with phenolic condensation products and made into a compact body by suitable pressure. Such pieces may be laminated structures of alternate sheets of paper or other fibrous material and the phenolic condensation product, or they may each consist of a single sheeted structure coated with phenolic condensation product or impregnated with it. The consolidation of the body may take place after the sheet or sheets have been coated or impregnated with the plastic material, in which case the latter may be wholly or partly cured or hardened at the same time that the structure is compressed. Or the fibrous body may first be compressed and the plastic material afterward applied thereto and hardened or cured. The binding between the molding material and the inserted sheetlike structure may be successfully made even if the inserted piece has been thoroughly hardened or cured before its insertion in the mold, but better results are attained when the inserted body contains phenolic condensation product material in partly cured condition so that the final hardening or curing of the coating or impregnating material of the inserted body takes place at the same time that the main body of the molding material is hardened.

In the claims I will refer to the inserted members as formed of fibrous material by which term I intend to include paper as well as other fibrous materials of well known character. The plastic material 6 which is filled into the mold, may be a partial phenol-formaldehyde condensation product, capable of transformation under the application of sufficient heat into the infusible product, or it may be a mixture of a fusible phenol resin with a hardening ingredient containing the methylene radical, or other materials may be used which are capable of transformation into the infusible phenolic condensation product under the application of sufficient heat. Such materials may, of course, have compounded therewith suitable filling materials or other additions as is well known in the art. I will refer in the claims to the molding material which is placed in the mold cavity about the extended portion of the inserted piece 4 as a phenolic condensation product adapted to be hardened to infusibility by heat, which term I intend to include the molding material in any of the forms in which it may be used and which are equivalent for the purpose of the present invention. Similarly I refer to the piece of fibrous material as being coated or impregnated with a phenolic condensation product, which term is intended to include the various materials with which the inserted body may be coated or impregnated and which will be transformed by heat into the infusible phenolic condensation product, if the same has not already been hardened or cured at the time of the use of such inserted piece in the mold.

What I claim is:

1. A method of molding a phenolic condensation product article having a projecting part of such character as to make the article difficult to mold, comprising fitting a piece of fibrous material coated or impregnated with a phenolic condensation product, of desired shape and size, into a recess in one of the mold members, so as to extend above the surface of the member, filling the mold about the extended portion of said piece with a phenolic condensation product adapted to be hardened to infusibility by heat, and applying heat and pressure to said product to mold the desired article with said inserted piece homogeneously bound thereto and projecting therefrom.

2. A method of molding a phenolic condensation product article having a projecting part of such character as to make the article difficult to mold, comprising, fitting into a recess in one of the mold members a sheetlike piece of desired shape and size, of compressed fibrous material coated or impregnated with phenolic condensation product, so as to extend above the surface of the member, filling the mold about the extended portion of said piece with a phenolic condensation product adapted to be hardened to infusibility by heat, and applying heat and pressure to said product to mold the desired article with said inserted piece homogeneously bound thereto and projecting therefrom.

3. A method of molding a phenolic condensation product article having a projecting part of such character as to make the article difficult to mold, comprising, fitting into a recess in one of the mold members a sheetlike piece, of desired shape and size, of fibrous material coated or impregnated with material capable of transformation by heat into an infusible phenolic condensation product, so as to extend above the surface of the member, filling the mold about the extended portion of said piece with a phenolic condensation product adapted to be hardened to infusibility by heat, and applying heat and pressure to said product to mold the desired article with said inserted piece homogeneously bound thereto and projecting therefrom.

4. A method of molding a phenolic condensation product article comprising, placing in a suitable location in the mold a sheetlike piece, of desired shape and size, of compressed fibrous material, coated or impregnated with a phenolic condensation product, filling the mold with a phenolic condensation product adapted to be hardened to infusibility by heat, and applying heat and pressure to said product to mold the desired article with said piece homogeneously bound thereto, in position to form a desired portion of the surface of the article.

This specification signed and witnessed this 11th day of September, 1918.

KIRK BROWN.

Witnesses:
EDNA MOSER,
C. L. CHAMBERLIN.